Nov. 23, 1948.  E. HAECKS  2,454,316
DOUGH CUTTER
Filed Oct. 3, 1947  2 Sheets-Sheet 1
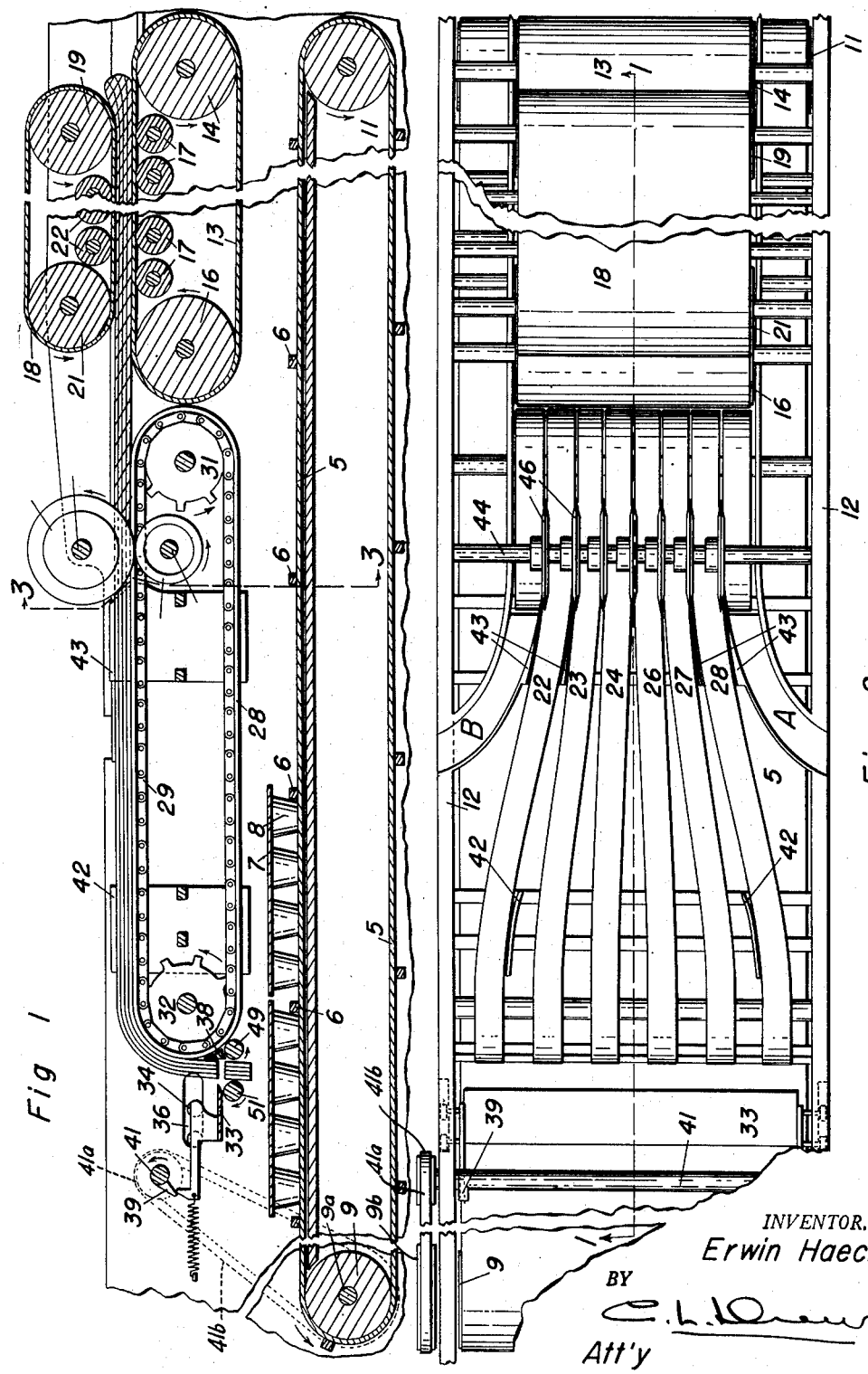
INVENTOR.
Erwin Haecks
BY
Att'y Nov. 23, 1948.  E. HAECKS  2,454,316
DOUGH CUTTER
Filed Oct. 3, 1947  2 Sheets-Sheet 2

INVENTOR.
Erwin Haecks
BY
Att'y

Patented Nov. 23, 1948

2,454,316

UNITED STATES PATENT OFFICE 2,454,316

DOUGH CUTTER

Erwin Haecks, San Francisco, Calif.

Application October 3, 1947, Serial No. 777,675

4 Claims. (Cl. 107—21)

This invention relates to improvements in dough cutters.

The principal object of this invention is to produce a machine which will cut a sheet of dough into strips of equal width and then to cut these strips into short lengths which are afterward dropped into muffin pans in a predetermined position, each piece of dough being placed in an individual cup of the pan.

A further object of the invention is to produce a device of the character described which is automatic in its operation from the time the dough is laid upon the cutter until the pans are delivered filled with dough from the machine.

A still further object is to produce a device of this character which is simple in construction, one which is sanitary and one which may be operated with a minimum amount of labor.

Other objects and advantages will be apparent during the course of the following description.

In the accompanying drawings forming a part of this specification and in which like numerals are employed to designate like parts throughout the same, Fig. 1 is a vertical cross sectional view taken on the line 1—1 of Fig. 2.

Fig. 2 is a top plan view of my machine.

In the making of raised biscuit such as butter rolls, raised muffins and the like it has been customary to roll out large sheets of dough and then with a pastry knife to cut narrow strips from the sheet and then to cut these strips into relatively short lengths, pick them up and individually place them cut edge downwardly into the individual cups of the muffin pans.

This procedure is very slow and requires much handling involving much labor, which all increases the cost of bread of this type.

Applicant has, therefore, devised a machine wherein a layer of dough is passed through the machine and rolled to a predetermined thickness and cut into strips, certain of which strips are individually carried to a remote point and separated one from another so that the strips will overlie the individual cups of the muffin pans and placed there beneath, and to then cut therefrom small portions of the strips and feed them downwardly so that they will drop in a predetermined position into the cups of the muffin pans.

In the accompanying drawings wherein for the purpose of illustration is shown a preferred embodiment of my invention the numeral 5 designates a conveyor belt having a plurality of cross bars 6 positioned thereon, which cross bars serve to definitely position on the belt muffin pans, as shown at 7.

Figure 4:
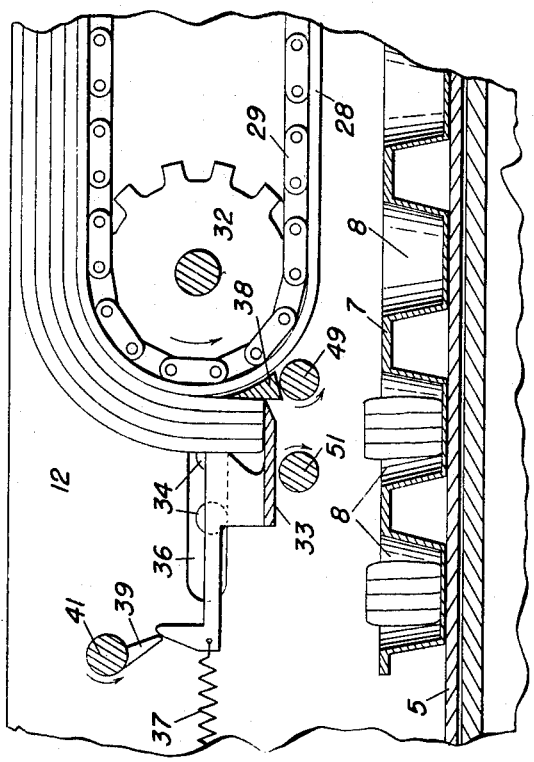
Fig. 4 is an enlarged fragmentary detail view showing the cutting mechanism.

These muffin pans have individual cups 8 formed therein. (See Fig. 4.)

This conveyor belt 5 is actuated from right to left of the drawing with an intermittent movement.

The rollers for the belt are shown at 9 and 11 and are supported in a framework designated as a whole by the numeral 12.

The roller 9 is fixed on a shaft 9a whereon a belt pulley 9b is also fixed.

Positioned above the conveyor belt 5 and spaced therefrom is a conveyor feed belt 13 which is reeved over rollers 14 and 16 and between the upper flight of the belt supporting rollers are employed, as shown at 17, the purpose of which is to keep the top flight from sagging.

Positioned above the conveyor feed belt 13 is a compression belt 18 which passes over rollers 19 and 21 and has rollers 22 bearing against the bottom flight of this compression belt so that the bottom flight will be spaced a definite distance from the belt 13.

In horizontal alignment with the conveyor feed belt 13 is a plurality of delivery belts as shown at 22, 23, 24, 26, 27 and 28, which belts consist of a linked chain as shown at 29. (See Fig. 1.) To this linked chain is cemented, or otherwise secured, the belt.

Figure 3:
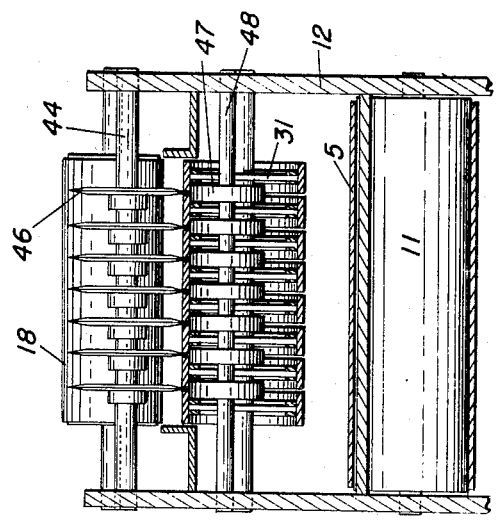
Fig. 3 is a cross sectional view taken on the line 3—3 of Fig. 1.

These chains are reeved over a series of spaced sprockets, as shown at 31 and 32. The sprockets 31 are in close side to side relation, as shown in Fig. 3, while the sprockets 32 are spaced from each other so that the ends of the delivery belts passing over the sprockets 32 will be spaced from each other a distance equal to the spacing of the cups 8 of the muffin pans 7, the purpose of which will be later seen.

In alignment with the delivery ends of the delivery belt 22 to 28 inclusive I position a cut off mechanism, which comprises a knife 33 supported by rollers 34 traveling in a slot 36 formed in the sides of the frame 12.

A spring 37 normally retracts the blade 33 from its engagement with a cutter block 38 but is reciprocated thereagainst by a rotating cam 39 mounted upon a rotating shaft 41. This shaft 41 has a belt pulley 41a fixed thereon and the pulley 41a is connected to the pulley 9b by a belt 41b.

In order to guide the chains throughout their flexing and so that they will remain upon their respective sprockets, I provide guide plates 42 and 43, the action of which is obvious.

At 44 I have shown a driven shaft upon which is mounted a plurality of cutting knives 46. These cutting knives extend downwardly between the belts 22 to 28 inclusive and bear against rubber rollers 47 mounted upon a shaft 48.

Positioned at the delivery end of the belts 22 to 28 inclusive are driven rollers 49 and 51, which serve to engage the downwardly extending end of the strips of dough and to momentarily hold them during the severing operation and to then drop the severed pieces of dough into the individual line of cups and at that time directly beneath the rollers in such a manner that the dough will be centered in the cup with one of its cut ends engaging the bottom of the cup.

The result of this construction is that when a sheet of dough is laid upon the feed conveyor belt 13 it will first be compressed against this belt by the compressor belt 18 and will then be delivered to the divided delivery belts 22 to 28 inclusive, where it will be engaged by cutters 46 and cut into strips.

The two outside strips will be delivered through the troughs "A" and "B" away from the machine inasmuch as these two strips of dough are the edge pieces of the sheet of dough and consequently are uneven.

The remaining strips of dough which are lying upon the delivery belt will be delivered to a remote point, each strip being separated from its next adjacent strip a sufficient distance to enter an individual cup or muffin pan, and when the strips are delivered over the discharge end of the delivery belts the strip will pass downwardly between the rollers 49 and 51 and be engaged thereby.

Intermittently, the knife 33 will be actuated so as to cut off a short length of dough from each of the strips, after the cutting of which the rollers 49 and 51 will drop the same into one of the cups of the muffin pan.

As the belt 5 advances, the filled muffin pans will eventually reach the end where they are collected and placed in racks so that the dough may raise and fill the cups ready for baking.

It will thus be seen that I have produced a device which will accomplish all of the objects above set forth. It is to be understood that the form of my invention herewith shown and described is to be taken as a preferred example of the same and that various changes relative to the material, size, shape and arrangement of parts may be resorted to without departing from the spirit of the invention or the scope of the subjoined claims.

What is claimed is:

1. In a dough cutter, a conveyor for supporting an elongated sheet of dough, rotary knives spaced across the conveyor for dividing the dough into strips and trimming the edges of the sheet, means for deflecting the edge trimmings laterally, dough strip supporting belts diverging forwardly from beneath the spaces between said knives, and a pair of guide rollers positioned to receive the dough strips as they pass from the supporting belts and direct them downwardly.

2. In a dough cutter, a conveyor for supporting an elongated sheet of dough, rotary knives spaced across the conveyor for dividing the dough into strips and trimming the edges of the sheet, means for deflecting the edge trimmings laterally, dough strip supporting belts diverging forwardly from beneath the spaces between said knives, a pair of guide rollers positioned to receive the dough strips as they pass from the supporting belts and direct them downwardly, a reciprocating knife operating above said guide rollers, and means to actuate said knife.

3. In a dough cutter, a conveyor for supporting an elongated sheet of dough, rotary knives spaced across the conveyor for dividing the dough into strips and trimming the edges of the sheet, means for deflecting the edge trimmings laterally, dough strip supporting belts diverging forwardly from beneath the spaces between said knives, a pair of guide rollers positioned to receive the dough strips as they pass from the supporting belts and direct them downwardly, a reciprocating knife operating above said guide rollers, means to actuate said knife, said last means including a conveyor receiving the dough severed by the knife, a cam intermittently engaging said knife for moving it rearwardly, a spring drawing the knife forwardly, and a belt connecting said last conveyor with said cam.

4. In a dough cutter, a dough sheet feeding conveyor for supporting a wide dough sheet, dough strip supporting means extending forwardly from the conveyor, a set of laterally spaced rotary cutting knives spaced across the strip supporting means with the knife edges extending between adjacent supporting means, said supporting means diverging forwardly of the knives, rubber collars against which said knife edges bear, guide means for deflecting the severed edge strips laterally, a pair of guide rollers positioned to receive the dough strips as they pass from the supporting belts and direct them downwardly, a reciprocating knife operating above said guide rollers, means to actuate said knife, said last means including a conveyor receiving the dough severed by the knife, a cam intermittently engaging said knife for moving it rearwardly, a spring drawing the knife forwardly, and a belt connecting said last conveyor with said cam.

ERWIN HAECKS.

REFERENCES CITED

The following references are of record in the file of this patent:

UNITED STATES PATENTS

| Number | Name | Date |
|---|---|---|
| 594,796 | Hofheimer | Nov. 30, 1897 |
| 866,946 | Magruder | Sept. 24, 1907 |
| 1,242,542 | Gammel | Oct. 9, 1917 |
| 1,527,262 | Martin | Feb. 24, 1925 |
| 1,938,110 | Neutelings | Dec. 5, 1933 |
| 2,109,812 | Whitefield | Mar. 1, 1938 |
| 2,256,927 | Pittman | Sept. 23, 1941 |